United States Patent [19]
Kikuchi et al.

[11] Patent Number: 5,160,376
[45] Date of Patent: Nov. 3, 1992

[54] CEMENT SETTING ACCELERATOR AND METHOD OF MANUFACTURING THE SAME

[75] Inventors: Masatsune Kikuchi; Hiroshi Omori; Hatsutoshi Hosoda; Susumu Kouda, all of Tokyo, Japan

[73] Assignee: Onoda Cement Co., Ltd., Onoda, Japan

[21] Appl. No.: 598,639

[22] PCT Filed: Mar. 28, 1990

[86] PCT No.: PCT/JP90/00413
§ 371 Date: Oct. 15, 1990
§ 102(e) Date: Oct. 15, 1990

[87] PCT Pub. No.: WO90/11257
PCT Pub. Date: Oct. 4, 1990

[30] Foreign Application Priority Data

Mar. 28, 1989 [JP] Japan .................. 1-76049

[51] Int. Cl.$^5$ .................. C04B 7/32; C04B 7/36; C04B 40/00; C04B 2/00
[52] U.S. Cl. .................. 106/819; 106/692; 106/695; 106/792; 106/796; 106/799
[58] Field of Search .......... 106/692, 695, 792, 796, 106/799, 819, 737, 787, 788

[56] References Cited

U.S. PATENT DOCUMENTS 4,650,523 3/1987 Kikuchi et al. .................. 106/315
4,798,628 1/1989 Mills et al. .................. 106/104

FOREIGN PATENT DOCUMENTS 63-206341 8/1988 Japan .

Primary Examiner—William R. Dixon, Jr.
Assistant Examiner—Michael A. Marcheschi
Attorney, Agent, or Firm—Frishauf, Holtz, Goodman & Woodward

[57] ABSTRACT

The present invention provides a cement setting accelerator comprising 100 parts by weight of a sintered body, 5 to 70 parts by weight of an alkali metal carbonate powder and at most 170 parts by weight of a lime powder and a method of manufacturing the same. The sintered body contains a predetermined ratio of $3CaO.2Na_2O.5Al_2O_3$, $Na_2SO_4$ and $Na_2O.Al_2O_3$. Alternatively, a predetermined ratio of $3CaO.2Na_2O.5Al_2O_3$, $Na_2SO_4$ and $4CaO.3Al_2O_3.SO_3$ are contained in the sintered body. Further, a raw material mixture, which is not sintered and equal in the chemical composition to the sintered body noted above, may be used in place of the sintered body. Setting and hardening of a cement paste is markedly promoted by adding a small amount of the cement setting accelerator of the present invention to the cement paste. Also, the initial setting time of the cement paste can be controlled by controlling the amount of addition of the cement setting accelerator of the present invention.

2 Claims, 4 Drawing Sheets

CEMENT SETTING ACCELERATOR AND METHOD OF MANUFACTURING THE SAME

TECHNICAL FIELD

The present invention relates to a cement setting accelerator and a method of manufacturing the same, particularly, to a cement setting accelerator which permits promptly setting a cement composition mixed with water with a small amount of addition, and also permits controlling the cement setting and hardening time as desired by increasing the addition amount of the accelerator.

PRIOR ART

Cement setting accelerators which permit accelerating the setting and hardening of a cement composition mixed with water are disclosed in Published Examined Japanese Patent Applications 56-27457 and 55-11635. The accelerator disclosed in Application 56-27457 noted above comprises calcium aluminate, sodium aluminate and sodium carbonate. The accelerator is certainly satisfactory in its capability of accelerating the setting of a cement composition. Specifically, a cement composition mixed with the cement setting accelerator disclosed in this prior art begins to set 30 seconds to 3 minutes after mixing of the composition with water, and the cement setting is substantially completed in about 10 minutes. However, it is difficult to retard as desired the initial setting time of the cement composition containing the cement setting accelerator disclosed in this prior art and mixed with water.

To be more specific, a cement paste having the setting accelerator added thereto begins to set promptly. Therefore, there is the defect that the cement paste begins to set before actual use when it is transported to a preferred position from the mixed position. It should also be noted that the cement setting accelerator disclosed in Application 56-2745 noted above certainly permits producing the particular effect in the case of a so-called "dry method", in which the accelerator is mixed previously with a cement composition and a cement paste is prepared by adding water to and mixing the composition. However, the setting acceleration effect is less than about half the level in the dry method in the case of a so-called "wet method", in which the cement setting accelerator is added to a cement paste prepared first without using the accelerator.

The technique disclosed in the other prior art, i.e., Application No. 55-11635, also gives rise to problems similar to those inherent in the Application No. 56-27457. In addition, the cement setting accelerator disclosed in Application No. 55-11635 is defective in that the initial setting time and the hardening performance are greatly changed depending on the kind of cement composition to which the accelerator is added.

Under the circumstances, it is very important in this technical field to develop a cement setting accelerator which permits promptly setting a cement composition mixed with water with a small amount of addition, which permits controlling the cement setting time as desired by increasing the addition amount of the accelerator, and which also permits sufficiently promoting the setting and hardening of a cement composition even in the case of the wet method.

DISCLOSURE OF THE INVENTION

According to the present invention, there is provided a cement setting accelerator consisting of a composition comprising 100 parts by weight of a sintered powdery material containing 4.25 to 85% of $3CaO.2Na_2O.5Al_2O_3$, 0.75 to 15% by Weight of $Na_2SO_4$, and at most 95% of $Na_2O.Al_2O_3$; 5 to 70 parts by weight of an alkali metal carbonate powder; and at most 170 parts by weight of a lime powder (described embodiment 1).

The present invention also provides a method of manufacturing a cement setting accelerator defined in claim 1, characterized by comprising the steps of sintering at 1150° C. or more a raw material containing 19.7 to 36.9% of $Na_2O$, 54.0 to 61.8% of $Al_2O_3$, 0.9 to 17.8% of $CaO$, and 0.4 to 8.5% of $SO_3$ so as to obtain a sintered body; pulverizing the sintered body; and adding 5 to 70 parts by weight of an alkali metal carbonate powder and at most 170 parts by weight of a lime powder to 100 parts by weight of the powder sintered body obtained by the pulverization and subsequently mixing the resultant mixture (described embodiment 2).

The present invention also provides a cement setting accelerator consisting of a composition comprising 100 parts by weight of a powdery material containing 4.25 to 85% of $3CaO.2Na_2O.5Al_2O_3$, 0.75 to 15% of $Na_2SO_4$, and at most 95% of $Na_2O.Al_2O_3$; 5 to 10 parts by weight of an alkali metal carbonate powder; and at most 170 parts by weight of a lime powder (described embodiment 3).

The present invention also provides a cement setting accelerator consisting of a composition comprising 100 parts by weight of a sintered powdery material containing 0.85 to 84.15% of $3CaO.2Na_2O.5Al_2O_3$, 0.15 to 14.85% by weight of $Na_2SO_4$, and 1 to 99% of $4CaO.3Al_2O_3.SO_3$; 5 to 70 parts by weight of an alkali metal carbonate powder; and at most 170 parts by weight of a lime powder (described embodiment 4).

The present invention also provides method of manufacturing a cement setting accelerator defined in described embodiment 4, characterized by comprising the steps of sintering at 1150° C. or more a raw material containing 0.2 to 19.5% of $Na_2O$, 50.2 to 54.0% of $Al_2O_3$, 18.0 to 36.5% of $CaO$, and 8.5 to 13.1% of $SO_3$ so as to obtain a sintered body; pulverizing the sintered body; and adding 5 to 70 parts by weight of an alkali metal carbonate powder and at most 170 parts by weight of a lime powder to 100 parts by weight of the powdery sintered body obtained by the pulverization and subsequently mixing the resultant mixture (described embodiment 5).

Further, the present invention provides a cement setting accelerator consisting of a composition comprising 100 parts by weight of a powdery material containing 0.85 to 84.15% of $3CaO.2Na_2O.5Al_2O_3$, 0.15 to 14.85% by weight of $Na_2SO_4$, and 1 to 99% of $4CaO.3Al_2O_3.SO_3$; 5 to 70 parts by weight of an alkali metal carbonate powder; and at most 170 parts by weight of a lime powder (described embodiment 6).

The cement setting accelerator of the present invention defined in described embodiment 1 is featured in that the accelerator contains a powdery material of a sintered body prepared by sintering a raw material containing $Na_2O$, $Al_2O_3$, $CaO$ and $SO_3$. The cement setting accelerator is prepared by adding suitable amounts of an alkali metal carbonate powder and a lime powder to the powdery material of the sintered body.

The sintered body used in the present invention contains $3CaO \cdot 2Na_2O \cdot 5Al_2O_3$, $Na_2SO_4$ and $Na_2O \cdot Al_2O_3$. As described later, the sintered body should contain 4.25 to 85% of $3CaO \cdot 2Na_2O \cdot 5Al_2O_3$, 0.75 to 15% of $Na_2SO_4$, and at most 95% $Na_2O \cdot Al_2O_3$. Desirably, the sintered body should contain 17 to 85% of $3CaO \cdot 2Na_2O \cdot 5Al_2O_3$, 3 to 15% of $Na_2SO_4$, and at most 80% of $Na_2O \cdot Al_2O_3$.

It should be noted that the ratio of $Na_2O \cdot Al_2O_3$ to $3CaO \cdot 2Na_2O \cdot 5Al_2O_3$ contained in the sintered body directly affects the setting speed and strength of the cement composition after the setting. To be more specific, the cement setting speed is promoted in the case where the sintered body contains a large amount of $Na_2O \cdot Al_2O_3$. In this case, however, the cement composition after the setting fails to exhibit a sufficiently high mechanical strength. By the contrary, a sintered body containing a large amount of $3CaO \cdot 2Na_2O \cdot 5Al_2O_3$ permits the cement composition after the setting to exhibit a high mechanical strength, though the setting speed is low in this case. It follows that it is possible to control as desired the setting speed and the hardening speed of the cement composition by suitably changing the weight ratio of $Na_2O \cdot Al_2O_3$ to $3CaO \cdot 2Na_2O \cdot 5Al_2O_3$ contained in the sintered body.

It should be noted in this connection hat CaO contained in the sintered body is low in its reactivity. Thus, it is difficult to obtain a sintered body containing $Na_2O \cdot Al_2O_3$ and $3CaO \cdot 2Na_2O \cdot 5Al_2O_3$ in a desired ratio by simply sintering a raw material mixture containing stoichiometrically determined amounts of the raw materials of CaO, $Al_2O_3$ and $Na_2O$. However, the present inventors have experimentally confirmed that the reaction of CaO is effectively promoted if $SO_3$ is also contained in the raw material mixture. In the case of adding $SO_3$, the molar ratio of $SO_3$ to CaO should be 1:3, as apparent from the reaction formula given below:

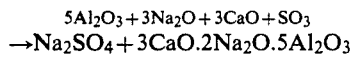
$$5Al_2O_3 + 3Na_2O + 3CaO + SO_3$$
$$\rightarrow Na_2SO_4 + 3CaO \cdot 2Na_2O \cdot 5Al_2O_3$$

Where the sintered body does not contain $Na_2O \cdot Al_2O_3$, and contains $3CaO \cdot 2Na_2O \cdot 5Al_2O_3$ and $Na_2SO_4$ alone, the content of $3CaO \cdot 2Na_2O \cdot 5Al_2O_3$ is 85.0% and the $Na_2SO_4$ content is 15.0%.

If the raw material mixture contains a small amount of CaO, $Na_2O \cdot Al_2O_3$ is formed in the sintered body. The $Na_2O \cdot Al_2O_3$ formation in the sintered body is decreased in proportion to the increase in the CaO content in the raw material mixture. In this case, however, $3CaO \cdot 2Na_2O \cdot 5Al_2O_3$ and $Na_2SO_4$ are also formed in the sintered body, with the result that the ratio of $3CaO \cdot 2Na_2O \cdot 5Al_2O_3$ to $Na_2SO_4$ is maintained at 85:15, as seen from samples $CA_5$ to $CA_{50}$ shown in Table 1 given later.

It follows that, where the sintered body does not contain $Na_2O \cdot Al_2O_3$, the sintered body consists of 85% of $3CaO \cdot 2Na_2O \cdot 5Al_2O_3$ and 15% of $Na_2SO_4$. A cement setting accelerator containing a sintered body of this composition permits improving the mechanical strength of the cement composition after the setting, though the initial setting time of the cement paste is retarded in this case. Where the sintered body contains 95% of $Na_2O \cdot Al_2O_3$, 3CaO$ \cdot 2Na_2O \cdot 5Al_2O_3$ and $Na_2SO_4$ are contained in the sintered body in an amount of 4.25% and 0.75%, respectively, as apparent from the ratio of $3CaO \cdot 2Na_2O \cdot 5Al_2O_3$ to $Na_2SO_4$ described above. Where the $Na_2O \cdot Al_2O_3$ content of the sintered body exceeds 95%, it is certainly possible to enable the cement setting accelerator to exhibit a high setting rate. However, the mechanical strength of the cement composition after the setting is low, making it impossible to put the cement setting accelerator to a practical use. Under the circumstances, it is important for the sintered body contained in the cement setting accelerator of the present invention to consist of the components defined described embodiment 1.

The sintered body is pulverized. It is desirable for the pulverized powdery material to have a Blaine specific surface area of 1500 to 8000 $cm^2/g$. A cement setting accelerator of the present invention is obtained by adding 5 to 70 parts by weight, preferably, 30 to 70 parts by weight, of an alkai metal carbonate powder and at most 170 parts by weight, preferably, 10 to 150 parts by weight, of a lime powder to 100 parts by weight of the powdery sintered body, followed by mixing the resultant composition.

The amounts of the alkali metal carbonate powder and the lime powder noted above are very important in the present invention. Attention should be paid in this connection to the setting and hardening mechanism of the cement composition involving the cement setting accelerator of the present invention. Specifically, $Ca(OH)_2$, $Al_2O_3$ and $SO_3$ eluted into liquid from the $Na_2O \cdot Al_2O_3$, $3CaO \cdot 2Na_2O \cdot 5Al_2O_3$ and $Na_2SO_4$ contained in the sintered body carry out reactions in the liquid phase with $Ca(OH)_2$ and $CaSO_4$ eluted into liquid from the $3CaO \cdot SiO_2$, $3CaO \cdot Al_2O_3$ and $CaSO_4 \cdot 2H_2O$ contained in the cement composition so as to form a hydrate of $3CaO \cdot Al_2O_3 \cdot 3CaSO_4 \cdot 32H_2O$ containing a large amount of crystal water, as given below:

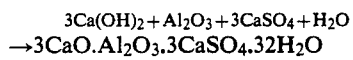
$$3Ca(OH)_2 + Al_2O_3 + 3CaSO_4 + H_2O$$
$$\rightarrow 3CaO \cdot Al_2O_3 \cdot 3CaSO_4 \cdot 32H_2O$$

The formation of the hydrate containing a large amount of crystal water given above is determined by the relationship in the amount among CaO, $Al_2O_3$ and $SO_3$ contained in the setting accelerator of the present invention and in the cement composition as well as by the dissolving rate of each of these components. When it comes to the rapid setting properties, it is very important to pay attentions to the relationship in the amount between CaO and $Al_2O_3$ eluted from the cement paste in the initial stage. Where the powdery sintered body contained in the cement setting accelerator of the present invention is singly added to a cement composition, the amount of $Al_2O_3$ is made excessive in the reaction system, resulting in shortage of CaO and, thus, fail to form the hydrate having a large amount of crystal water. To make up for the CaO shortage, it is necessary to add CaO or $Ca(OH)_2$. The addition amount of CaO or $Ca(OH)_2$ may be determined appropriately in view of the CaO content of the sintered body used in the present invention. In the present invention, the addition amount of a lime powder has been experimentally determined to be at most 170 parts by weight, i.e., 0 to 170 parts by weight, relative to 100 parts by weight of the powdery sintered body.

It should be noted that the elution rate of aluminum ions from the sintered body is low, making it necessary to promote the elution of aluminum ions from the sintered body. To this end, an alkali metal carbonate serving to promote the aluminum ion elution is added in the present invention. In the present invention, the addition amount of the alkali metal carbonate has been experimentally determined to be 5 to 70 parts by weight relative to 100 parts by weight of the powdery sintered body.

As described above, the present invention defined in described embodiment 1 provides a cement setting accelerator comprising 100 parts by weight of a powdery sintered body, 5 to 70 parts by weight of an alkali metal carbonate powder and at most 170 parts by weight of a lime powder. The composition of the sintered body is particularly important in the cement setting accelerator of the present invention.

The present invention defined in described embodiment 2 is directed to a method of manufacturing the cement setting accelerator defined in claim 1. The method defined in described embodiment 2 comprises the step of preparing a sintered body contained as a main component in the cement setting accelerator defined in described embodiment 1.

Specifically, the sintered body is prepared by sintering a raw material mixture containing a predetermined mixing ratio of $Na_2O$, $CaO$, $Al_2O_3$ and $SO_3$. Sodium carbonate, sodium bicarbonate, etc. can be used as a source of $Na_2O$. Limestone, quick lime, etc. can be used as a source of $CaO$. $Al(OH)_3$ can be used as a source of $Al_2O_3$ in addition to alumina. Further, $CaSO_4$, $Al_2(SO_4)_3$, etc. can be used is a source of $SO_3$. In order to obtain a sintered body defined in the present invention, the raw material mixture used should contain 19.7 to 36.9% of $Na_2O$, 54.0 to 61.8% of $Al_2O_3$, 0.9 to 17.8% of $CaO$, and 0.4 to 8.5% of $SO_3$. Preferably, the raw material mixture should contain 19.7 to 34.2% of $Na_2O$, 54.0 to 60.6% of $Al_2O_3$, 3.6 to 17.8% of $CaO$, and 1.7 to 8.5% of $SO_3$.

The raw material mixture of the composition described above is sintered at 1150° C. or more, preferably, at 1200° C. or more, followed by pulverizing the sintered body. Then, 5 to 70 parts by weight of an alkali metal carbonate powder and at most 170 parts by weight of a lime powder are added to 100 parts by weight of the resultant powdery sintered body, and the mixture is fully mixed so as to obtain a cement setting accelerator of the present invention.

Let us described more in detail the sintered body contained in the cement setting accelerator of the present invention defined in described embodiment 1 with reference to Experiments reported below, which were conducted by the present inventors.

Experiment 1

Sodium carbonate, alumina, calcium carbonate and calcium sulfate, which are available on the market as first grade reagents, were used as the starting materials. These starting materials were mixed in a mixing ratio shown in Table 1. Since CaO is dissipated from sodium carbonate and calcium carbonate when heated to 950° C., these starting materials were excessively used in view of the $CO_2$ dissipation noted above.

100 g of the raw material mixture was put in a platinum dish and heated to 1300° C. at a rate of 20° C./min. The temperature was maintained at 1300° C. for 30 minutes so as to sinter the raw material mixture. The sintered body was sufficiently pulverized with a porcelain mortar so as to prepare a powdery material. When the powdery material was identified by mean of an X-ray diffractometry, various minerals were found in the resultant powdery material, as denoted by symbols $CA_5$ to $CA_{50}$ in Table 1. Incidentally, the abbreviations shown in Table 1 and in the following description denote:

| | |
|---|---|
| $C_3N_2A_5$ | $3CaO.2Na_2O.5Al_2O_3$ |
| $N\overline{S}$ | $Na_2SO_4$ |
| $NA$ | $Na_2O.Al_2O_3$ |
| $C_4A_3\overline{S}$ | $4CaO.3Al_2O_3.SO_3$ |

TABLE 1

| Symbol | Feature | mineral formation (wt %) | | | | raw material composition (wt %) | | | |
|---|---|---|---|---|---|---|---|---|---|
| | | $C_3N_2A_5$ | $N\overline{S}$ | NA | $C_4A_3\overline{S}$ | $Na_2O$ | $Al_2O_3$ | CaO | $SO_3$ |
| $CA_5$ | NA 95% | 4.25 | 0.75 | 95 | 0 | 36.9 | 61.8 | 0.9 | 0.4 |
| $CA_{20}$ | NA 60% | 34 | 6 | 60 | 0 | 30.5 | 58.9 | 7.2 | 3.4 |
| $CA_{40}$ | NA 20% | 68 | 12 | 20 | 0 | 23.3 | 55.7 | 14.2 | 6.8 |
| $CA_{50}$ | NA 0% | 85 | 15 | 0 | 0 | 19.7 | 54.0 | 17.8 | 8.5 |
| $CA_{51}$ | $C_4A_3\overline{S}$ 1% | 84.15 | 14.85 | 0 | 1 | 19.5 | 54.0 | 18.0 | 8.5 |
| $CA_{60}$ | $C_4A_3\overline{S}$ 20% | 68 | 12 | 0 | 20 | 15.7 | 53.2 | 21.6 | 9.5 |
| $CA_{80}$ | $C_4A_3\overline{S}$ 60% | 34 | 6 | 0 | 60 | 7.9 | 51.7 | 29.1 | 11.3 |
| $CA_{99}$ | $C_4A_3\overline{S}$ 99% | 0.85 | 0.15 | 0 | 99 | 0.2 | 50.2 | 36.5 | 13.1 |

As seen from Table 1, the sintered bodies of samples $CA_5$ to $CA_{50}$ were found to contain 4.25 to 85% of $C_3N_2A_5$, 0.75 to 15% of NS and 0 to 95% of NA, as defined in described embodiment 1.

The sintered body contained in the cement setting accelerator of the present invention permits controlling the setting time of a cement paste while maintaining a predetermined mechanical strength of the cement composition. As described previously, the setting is promoted by the increase in the NA content of the sintered body. On the other hand, the setting rate of $C_3N_2A_5$ is lower than that of NA. This is because $C_3N_2A_5$ enables the cement composition after the setting to exhibit a greater mechanical strength. Incidentally, $N\overline{S}$ is a reaction product between $Na_2O$ and $SO_3$ serving to improve the reactivity of CaO in the process of forming $3CaO.2Na_2O.5Al_2O_3$ and $Na_2O.Al_2O_3$, as described previously. In other words, $N\overline{S}$ is not particularly relevant to the setting and hardening of the cement composition.

The present invention defined in described embodiment 3 is very close to the invention defined in described embodiment 1, the sole difference being that the raw material mixture, which is sintered in the invention of described embodiment 1, is not sintered in the invention of described embodiment 3. To be more specific, described embodiment 3 is equal to described embodiment 1, except that 5 to 70 parts by weight of an alkali metal carbonate powder and at most 170 parts by weight of a lime powder are added in described embodiment 3 to 100 parts by weight of a powder mixture consisting of 4.25 to 85% of $3CaO.2Na_2O.5Al_2O_3$, 0.75 to 15% of $Na_2SO_4$, and at most 95% of $Na_2O.Al_2O_3$. Described embodiment 3 is also equal to described embodiment 1 in the reasons for the mixing ratio of the components of the cement setting accelerator. The cement setting accelerator defined in described embodiment 3 is somewhat inferior to that defined in described embodiment 1 in the effect of promoting the setting and hardening of a cement composition, but is superior to the conventional cement setting accelerator in the particular effect noted above.

In the present invention as disclosed in described embodiment 4, a sintered body is used as a main component of the cement setting accelerator, as in described embodiment 1. However, the sintered body used in the invention defined in described embodiment 4 and containing $3CaO.2Na_2O5Al_2O_3$, $Na_2SO_4$ and $4CaO.3Al_2O_3.SO_3$ differs in composition from that used in the invention defined in described embodiment 1. To be more specific, the sintered body used in the invention of described embodiment 4 contains 0.85 to 84.15% of $3CaO.2Na_2O.5Al_2O_3$, 0.15 to 14.85% of $Na_2SO_4$ and 1 to 99% of $4CaO.3Al_2O_3.SO_3$. Preferably, the sintered body should contain to 8.5 to 84.15% of $3CaO.2Na_2O.5Al_2O_3$, 1.5 to 14.85% of $Na_2SO_4$ and 1 to 90% of $4CaO.3Al_2O_3.SO_3$. The reaction to form $4CaO.3Al_2O_3.SO_3$ within the sintered body is as follows:

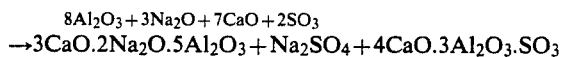

$$8Al_2O_3 + 3Na_2O + 7CaO + 2SO_3$$
$$\rightarrow 3CaO.2Na_2O.5Al_2O_3 + Na_2SO_4 + 4CaO.3Al_2O_3.SO_3$$

The reaction given above takes place in the case where the raw material contains at most 19.5% of $Na_2O$ and at least 18.0% of CaO. The formation of $4CaO.3Al_2O_3.SO_3$ is increased with decrease in the $Na_2O$ content and with increase in the CaO content of the raw material. In the case of using the sintered body defined in described embodiment 4, the setting of the cement paste is retarded with increase in the content of $4CaO.3Al_2O_3.SO_3$, but is promoted with increase in the content of $3CaO.2Na_2O.5Al_2O_3$. The mineral components of the sintered body are substantially the same in the effect given to the mechanical strength of the cement composition after the setting. In an extreme case where $Na_2O$ is not contained in the raw material, $4CaO.3Al_2O_3.SO_3$ is formed in an amount of 100%. In this case, the setting of the cement paste is so much retarded as to make it substantially impossible to put the cement setting accelerator to a practical use. Where the sintered body contains 99% of $4CaO.3Al_2O_3.SO_3$, however, the cement setting accelerator produces a practically satisfactory effect. Therefore the upper limit of the $4CaO.3Al_2O_3.SO_3$ is determined to be 99%, the lower limit of the $3CaO.2Na_2O.5Al_2O_3$ and $Na_2SO_4$ contents are determined to be 0.85% and 0.15%, respectively, because the ratio of $3CaO.2Na_2O.5Al_2O_3$ to $Na_2SO_4$ should be 85:15 as described previously in conjunction with the cement setting accelerator defined in claim 1. On the other hand, the lower limit of the $4CaO.3Al_2O_3.SO_3$ content is set at 1% in the present invention in described embodiment 4 so as to make the invention of described embodiment 4 clearly distinctive from the invention defined in described embodiment 1. In this connection, the upper limits of the $3CaO.2Na_2O.5Al_2O_3$ and $Na_2SO_4$ contents are determined to be 84.15% and 14.85%, respectively.

The sintered body in described embodiment 4 is pulverized into a powdery material, as in described embodiment 1. The powdery sintered body should desirably have a specific surface area of 1500 to 8000 cm$^2$/g. It should be noted that 5 to 70 parts by weight, preferably, 30 to 70 parts by weight, of an alkali metal carbonate powder, and at most 170 parts by weight, preferably, 10 to 150 parts by weight, of a lime powder are added to 100 parts by weight of the sintered body, and the mixture is mixed so as to obtain a cement setting accelerator defined in described embodiment 4. The reasons for the amounts of the alkal metal carbonate powder and the lime powder specified in described embodiment 4 are equal to those explained previously in conjunction with the invention defined in described embodiment 1.

The invention defined in described embodiment 5 is directed to a method of manufacturing the cement setting accelerator defined in described embodiment 4. For manufacturing the cement setting accelerator of the present invention, it is necessary to prepare first a sintered body contained as a main component in the cement setting accelerator. For preparing the sintered body, a raw material prepared by mixing a predetermined ratio of $Na_2O$, $Al_2O_3$, CaO and $SO_3$ is heated at a predetermined temperature. The materials of $Na_2O$, $Al_2O_3$, CaO and $SO_3$ are equal to those explained previously in conjunction with the invention defined in described embodiment 2. To reiterate, sodium carbonate and sodium bicarbonate can be used as sources of $Na_2O$. $Al_2(OH)_3$ can also be used as the $Al_2O_3$ material in addition to alumina. $CaSO_4$, $Al_2(SO_4)_3$, etc. can be used as the $SO_3$ material. Further, limestone, quick lime, etc. can be used as the CaO material In order to obtain a sintered body of the composition defined in the present invention, it is necessary to use a raw material containing 0.2 to 19.5% of $Na_2O$, 50.2 to 54.0% of $Al_2O_3$, 18.0 to 36.5% of CaO and 8.5 to 13.1% of $SO_3$. Preferably, the raw material should contain 2.0 to 19.5% of $Na_2O$, 50.6 to 54.0% of $Al_2O_3$, 18.0 to 34.8% of CaO and 8.5 to 12.6% $SO_3$. The raw material of the composition noted above should be sintered at 1150° C. or more, preferably, at 1200° C. or more, as in the invention defined in described embodiment 2. The sintering conditions are equal to those explained previously in conjunction with described embodiment 2. The sintered body is pulverized into a powdery sintered body, and 5 to 70 parts by weight of an alkali metal carbonate powder and at most 170 parts by weight of a lime powder are added to 100 parts by weight of the powdery sintered body so as to obtain a desired cement setting accelerator of the present invention.

The present invention defined in described embodiment 6 is very close to the invention defined in described embodiment 4, the sole difference being that a mixture of the individual raw materials, which are contained in the sintered body used in the present invention of described embodiment 4, is used in the invention of described embodiment 6 in place of the sintered body. To be more specific, 5 to 70 parts by weight of an alkali metal carbonate powder and at most 170 parts by weight of a lime powder are added in the invention of described embodiment 6 to 100 parts by weight of a powdery mixture consisting of 0.85 to 84.15% of $3CaO.2Na_2O5Al_2O._3$, 0.15 to 14.85% of $Na_2SO_4$ and 1 to 99% of $4CaO.3Al_2O_3.SO_3$ so as to prepare a desired cement setting accelerator. The reasons for the mixing ratio of the components as well as the preferred ranges of the contents of the individual components of the accelerator specified in described embodiment 6 are equal to those in described embodiment 4. The cement setting accelerator defined in described embodiment 6 is somewhat inferior to that defined in described embodiment 4 in the setting rate of the cement paste and the mechanical strength of the cement composition after the setting, but is superior to the conventional cement setting accelerator.

Experiment 2

First grade reagents of sodium carbonate, alumina, calcium carbonate and calcium sulfate, which are available on the market, were used as the raw materials, as in Experiment 1. These raw materials were mixed as denoted by samples $CA_{51}$ to $CA_{99}$ in Table 1. As pointed out previously, $CO_2$ is dissipated at 950° C. from sodium carbonate and calcium carbonate contained in the raw material mixture in the process of sintering the raw material mixture. In view of the dissipation, these sodium carbonate and calcium carbonate were used in excess amounts.

The raw material mixture was sintered and, then, the sintered body was sufficiently pulverized in a porcelain mortar. The pulverized sintered body thus prepared was identified by means of X-ray diffraction so as to confirm the mineral formation as denoted by symbols $CA_{51}$ to $CA_{99}$ in Table 1.

The effect of the cement setting accelerator was confirmed as follows. Specifically, each of sintered bodies prepared as in Experiments 1 and 2 was pulverized until the pulverized particles had a diameter of 0.3 mm or less. Then, sodium carbonate and slaked lime were mixed with the pulverized sintered body in amounts shown in Table 2 so as to prepare a cement setting accelerator. On the other hand, a cement paste was separately prepared by sufficiently mixing in a synthetic resin container having an inner volume of 200 ml a water/cement mixture mixed at a ratio of 0.6. The samples of the cement setting accelerator were added to 160 g of the cement paste in outer percentage by weight of 5, 8, 15 and 20%, respectively The mixture was rapidly mixed with a spatula for about 10 seconds so as to permit the cement setting accelerator to be mixed sufficiently with the cement paste. After the surface was smoothed, the mixed cement paste was allowed to stand still so as to measure the initial setting time and final setting time of the cement paste setting in accordance with the test method specified in JIS R5201. In this test, a weight of 300 g was put on a setting tester. Table 2 shows the results. Table 2 also shows comparative experiment, i.e., use of a rapid setting agent $CA_0$ consisting of NA, sodium carbonate and slaked lime, and use of a cement setting accelerator $CA_{01}$ available on the market. Incidentally, the parenthesized symbols shown in Table 2, i.e., ($CA_{20}$), ($CA_{40}$), ($CA_{60}$), and ($CA_{80}$), denote that the compositions equal to those of $CA_{20}$, $CA_{40}$, $CA_{60}$ and $CA_{80}$ were used simply as mixtures of the individual powdery components, not as minerals as in the symbols without the parentheses.

TABLE 2

| Symbol | Mineral Composition or Mixture Composition (wt %) | | | | Composition of Cement Setting Accelrator (wt %) | | |
|---|---|---|---|---|---|---|---|
| | $C_3N_2A_5$ | $N\overline{S}$ | NA | $C_4A_3\overline{S}$ | mineral or mixture | sodium carbonate | slaked lime |
| $CA_0$ | — | — | 100 | — | 40 | 20 | 40 |
| $CA_5$ | 4.25 | 0.75 | 95 | — | 40 | 20 | 40 |
| $CA_{20}$ | 34 | 6 | 60 | — | 40 | 20 | 40 |
| $CA_{40}$ | 68 | 12 | 20 | — | 50 | 20 | 30 |
| $CA_{50}$ | 85 | 15 | — | — | 60 | 20 | 20 |
| $CA_{51}$ | 84.15 | 14.85 | 0 | 1 | 60 | 20 | 20 |
| $CA_{60}$ | 68 | 12 | — | 20 | 70 | 20 | 10 |
| $CA_{80}$ | 34 | 6 | — | 60 | 85 | 15 | 0 |
| $CA_{99}$ | 0.85 | 0.15 | — | 99 | 95 | 5 | 0 |
| $CA_{01}$ | 34 | 6 | 60 | — | 40 | 20 | 40 |
| ($CA_{20}$) | 34 | 6 | 60 | — | 40 | 20 | 40 |
| ($CA_{40}$) | 68 | 12 | 20 | — | 50 | 20 | 30 |
| ($CA_{60}$) | 68 | 12 | — | 20 | 70 | 20 | 10 |
| ($CA_{80}$) | 34 | 6 | — | 60 | 85 | 15 | — |

| | Addition Amount of Cement Setting Accelerator to Cement (outer % by weight) | | | | | | | |
|---|---|---|---|---|---|---|---|---|
| | 5% | | 8% | | 15% | | 20% | |
| Symbol | initial time (min., sec.) | final time (min., sec.) | initial time (min., sec.) | final time (min., sec.) | initial time (min., sec.) | final time (min., sec.) | initial time (min., sec.) | final time (min., sec.) |
| $CA_0$ | 2' | 60' or more | 2' | 60' or more | 10" | 60' or more | 10" | 60' or more |
| $CA_5$ | 2'30" | 30' | 2' | 30' | 15" | 10' | — | — |
| $CA_{20}$ | 2'30" | 27' | 1' | 20' | 15" | 5' | 10" | 3' |
| $CA_{40}$ | 5' | 27' | 4' | 14' | 1'30" | 5' | 1' | 3' |
| $CA_{50}$ | 10' | 35' | 5' | 17' | 2'30" | 10' | 1'30" | 4' |
| $CA_{51}$ | 12' | 36' | 6' | 18' | 2'40" | 10' | 1'40" | 4' |
| $CA_{60}$ | 23' | 47' | 10' | 22' | 5' | 15' | 2' | 5' |
| $CA_{80}$ | 33' | 50' | 20' | 35' | 7' | 20' | 6' | 20' |
| $CA_{99}$ | — | — | 30' | 55' | 15' | 45' | 10' | 30' |
| $CA_{01}$ | 12' | 60' or more | 3' | 60' or more | 10" | 60' or more | 10" | 10' |
| ($CA_{20}$) | 10' | 50' | 2' | 60' or more | 10" | 10' | 10" | 7' |
| ($CA_{40}$) | 15' | 60' or more | 2' | 60' or more | 10" | 10' | 10" | 5' |
| ($CA_{60}$) | 12' | 60' or more | 2' | 30' | 15" | 11' | 30" | 8' |

TABLE 2-continued

| | | | | | | |
|---|---|---|---|---|---|---|
| (CA$_{80}$) 13' | 60' or more 2' | 60' or more 3' | 17' | 3' | 15' | |

As seen from Table 2, any kind of the cement setting accelerator of the present invention exhibits an excellent rapid setting property FIGS. 1 to 4 show the results of the experiments, covering the different adding amounts of the cement setting accelerator, respectively. It is clearly seen from FIGS. 1 to 4 that the cement setting accelerator of the present invention exhibits an excellent rapid setting and hardening property. It is important to note that the cement setting accelerator of the present invention makes it possible to control the setting time by controlling the mineral composition and the adding amount of the cement setting accelerator. It should also be noted that the parenthesized samples of (CA$_{20}$), (CA$_{40}$), (CA$_{60}$) and (CA$_{80}$) were somewhat inferior to the samples of CA$_{20}$, CA$_{40}$, CA$_{60}$ and CA$_{80}$ without the parentheses in the rapid setting property and the hardening time, but were superior to the comparative experiment of CA$_0$ and CA$_{01}$, though the parenthesized samples are not shown in the drawings.

Example 1

A raw material containing 46.4% of sodium carbonate, 47.9% of alumina, 3.4% of limestone, and 2.3% of anhydrous gypsum was prepared by suitably mixing powdery materials of alumina (Al$_2$O$_3$, 99.7%), sodium carbonate (Na$_2$O, 58.2%), limestone (CaO, 53.2%; MaO, 0.5%; Fe$_2$O$_3$, 0.2%; and Al$_2$O$_3$, 0.1%) and anhydrous gypsum (CaO, 41%; SO$_3$, 58.7%). The raw material was sufficiently mixed and, then, sintered in a sintering furnace at 1300° C.±50° C. for 30 minutes so as to obtain a sintered body.

The resultant sintered body was found to contain 80% of NA, 17% of C$_3$N$_2$A$_5$, and 3% of N$\bar{S}$. In other words, the sintered body was found to contain 34.1% of Na$_2$O, 60.6% of Al$_2$O$_3$, 3.6% of CaO and 1.7% of SO$_3$. Then, the sintered body was pulverized into a powdery material having a Blain specific surface area of 3500 cm$^2$/g. A cement setting accelerator was prepared by adding 60 parts by weight of sodium carbonate and 130 parts by weight of quick lime to 100 parts by weight of the powdery sintered body thus prepared. The resultant cement setting accelerator was applied to the face in the presence of spring water in a tunneling site as follows.

In the first step, cloth was applied to provisionally stop spring water at the rate of 400 to 1000 1/min/5 m$^2$ in a freshet portion at the face In a tunneling site, followed by placing in a cavity of the cloth a cement composition prepared by mixing 20 parts by weight of the cement setting accelerator prepared as above with 100 parts by weight of the ordinary Portland cement. The portion where the cement composition was placed was supported with a flat plate for about 2 minutes so as to completely stop the spring water, followed by applying a concrete spraying by the ordinary method. An additional spring water and fall of the concrete layer were not recognized at all after the treatment.

EXAMPLE 2

A raw material containing 32.2% of sodium carbonate, 44.9% of alumina, 13.5% of limestone, and 9.4% of anhydrous gypsum was prepared by suitably mixing powdery materials of alumina, sodium carbonate, limestone and anhydrous gypsum, as in Example 1. The raw material was sufficiently mixed and, then, sintered as in Example 1 so as to obtain a sintered body.

The resultant sintered body was found to contain 20% of NA, 68% of C$_3$N$_2$A$_5$, and 12% of N$\bar{S}$. In other words, the sintered body was found to contain 23.3% of Na$_2$O, 55.7% of Al$_2$O$_3$, 14.2% of CaO and 6.8% of SO$_3$. Then, the sintered body was pulverized as in Example 1 into a powdery material having a Blain specific surface area of 3500 cm$^2$/g. A cement setting accelerator was prepared by adding 60 parts by weight of sodium carbonate and 90 parts by weight of quick lime to 100 parts by weight of the powdery sintered body thus prepared. The resultant cement setting accelerator was used in a tunnel-boring site as follows.

In the first step, concrete was prepared by mixing a mixture consisting of 360 kg of the ordinary portland cement, 1020 kg of a fine aggregate, 686 kg of a coarse aggregate having a maximum size of 15 mm, and 205 kg of water. The concrete thus prepared was transported by a track mixer to the face of a tunneling site and sprayed through a hose including a Y-shaped branched portion to the face by a compressed air. The Y-shaped branched portion was positioned about 3 m inside the tip of the blowing nozzle mounted at the tip of the hose. The cement setting accelerator prepared as above was also sprayed by a compressed air through one of the branches of the hose such that the cement setting accelerator was added in an amount of 3 to 10% by weight (outer percentage) based on the amount of the cement contained in the concrete.

The concrete mixed with the cement setting accelerator was sprayed through the nozzle onto the ceiling and wall of the arching tunnel. The average thickness of the concrete layer formed on the wall of the tunnel was about 20 cm. The amount of the cement setting accelerator was 3.5% on the average based on the amount of the cement contained in the concrete. The average thickness of the concrete layer formed on the ceiling of the tunnel was 20 to 50 cm. The amount of the cement setting accelerator was 6.5% on the average based on the amount of the cement contained in the concrete. In the case of the ceiling portion where 40 to 100 1/min/5 m$^2$ of spring water was recognized, the concrete layer fell off in spite of the increase in the addition amount of the cement setting accelerator to 7% based on the amount the cement contained in the concrete. However, the all was prevented when the amount of the cement setting accelerator was further increased to 9%.

On the other hand, concrete was similarly sprayed, by using a rapid setting agent available on the market consisting of calcium aluminate, sodium aluminate, sodium carbonate and lime. The amount of the rapid setting agent was 5.0% in the case of the wall of the tunnel and 9.0% in the case of the ceiling of the tunnel on the average based on the amount of the cement contained in the concrete. Further, it was impossible to prevent the sprayed concrete layer from falling off in the presence of spring water, though the amount of the rapid setting agent was increased up to 15%.

EXAMPLE 3

A raw material containing 10.7% of sodium carbonate, 41.3% of alumina, 30.8% of limestone, and 17.2% of dihydrated gypsum was prepared by suitably mixing powdery materials of alumina ($Al_2O_3$, 98.1%), sodium carbonate ($Na_2O$, 58.2%), limestone (CaO, 54.0%; MaO, 0.3%; and $Fe_2O_3$ 0.1%) and dihydrated gypsum (CaO, 36.1%, $SO_3$ 51.9%). The raw material was sufficiently mixed and, then, sintered in a sintering furnace at 1250° C. ±50° C. for 30 minutes so as to obtain a sintered body.

The resultant sintered body was found to contain 60% of $C_4A_3\bar{S}$, 34% of $C_3N_2A_5$, and 6% of $N\bar{S}$. In other words, the sintered body was found to contain 7.9% of $Na_2O$, 51.7% of $Al_2O_3$, 29.1% of CaO and 11.3% of $SO_3$. Then, the sintered body was pulverized into a powdery material having a Blain specific surface area of 3200 cm²/g. A cement setting accelerator was prepared by adding 15 parts by weight of sodium carbonate to 100 parts by weight of the powdery sintered body thus prepared. A concrete layer was repaired as follows by using the resultant cement setting accelerator thus prepared.

Specifically, vertical shaft mixer having an inner volume of 200 liters and an air compression pump were installed besides a repair portion of a concrete slab on which a train runs every hour. A flowable concrete was prepared by keanding a mixture consisting of 370 kg of cement, 1150 kg of a fine aggregate, 675 kg of a coarse aggregate, 150 kg of water and 1.75 kg of a fluidizing agent available on the market per cubic meter of the concrete mixture. The flowable concrete thus prepared was forwarded through the pump into a polyethylene bucket disposed at the repair portion 50 m away from the location of the concrete mixer. Fifty liters of the flowable concrete was received by the polyethylene bucket having an inner volume of 100 %. Then, 1.1 kg of the cement setting accelerator prepared in advance was added to the concrete received in the bucket, and mixing was carried out for 2 to 3 minutes by a handy type mixer. The content of the cement setting accelerator was 6% based on the amount of the cement contained in the concrete. The mixed concrete was placed on the repair portion, followed by applying a surface-finishing treatment so as to complete the repair. Since initiation of the concrete setting was recognized 25 minutes after the mixing of the concrete with the cement setting accelerator added thereto, the repair work was completed without difficulty. The compression strength of a test piece of the same material was measured 1 hour after completion of the repair work. The compression strength was found to be 35 kgf/cm², which is high enough to withstand the running of a train.

EXAMPLE 4

An agent B containing 95% or more of $C_3N_2A_5$ was prepared by sufficiently mixing the raw materials consisting of 42.8% of alumina, 26.6% of sodium carbonate, and 40.9% of limestone as in Example 1, followed by sintering the raw material mixture at 1300° C.±50° C. in a sintering furnace. Likewise, an agent A containing 98% or more of NA was prepared by sufficiently mixing the raw materials consisting of 49% of alumina and 51% of sodium carbonate, followed by sintering the raw material mixture at 1250° C.±50° C. in a sintering furnace. Then, a cement setting accelerator was prepared by uniformly mixing 24 parts by weight of agent A, 13.6 parts by weight of agent B, 2.4 parts by weight of sodium sulfate available on the market, 20 parts by weight of sodium carbonate and 45 parts by weight of slaked lime.

Concrete spraying was carried out as in Example 2 by using the cement setting accelerator thus prepared. The average amount of the cement setting accelerator used based on the amount of the cement contained in the concrete was 4.0% in the wall of the tunnel and 8.0% in the ceiling of the tunnel. In the water spring portion, fall of the concrete layer was prevented when the amount of the cement setting accelerator was increased to 12%.

EFFECT OF THE INVENTION

As described above in detail, the present invention provides a cement setting accelerator which permits the setting of cement to be carried out in a short time and also permits controlling the initial setting time of the cement composition over a range of about 30 minutes starting with the time immediately after the addition of the cement setting accelerator. It follows that the cement setting accelerator of the present invention can be effectively used for the spraying of mortar or concrete which is required to be viscous at the time of spraying and to be set rapidly after the spraying. Also, since the initiation time of the cement paste setting can be controlled over a wide range as noted above, it is of course possible to use the accelerator of the present invention as the broadly used cement setting accelerator requiring a determination in advance of the setting reaction.

What should also be noted is that the cement setting accelerator of the present invention can be used both in a wet method in which the accelerator is added to a cement paste and in a dry method in which the accelerator is mixed previously with the cement. It follows that the cement setting accelerator of the present invention can be effectively used in a method which is popular nowadays, i.e., the method in which a cement paste mixed previously is forwarded to the place of application and the cement setting accelerator is added to the cement paste forwarded to the place of application.

Figure 1:
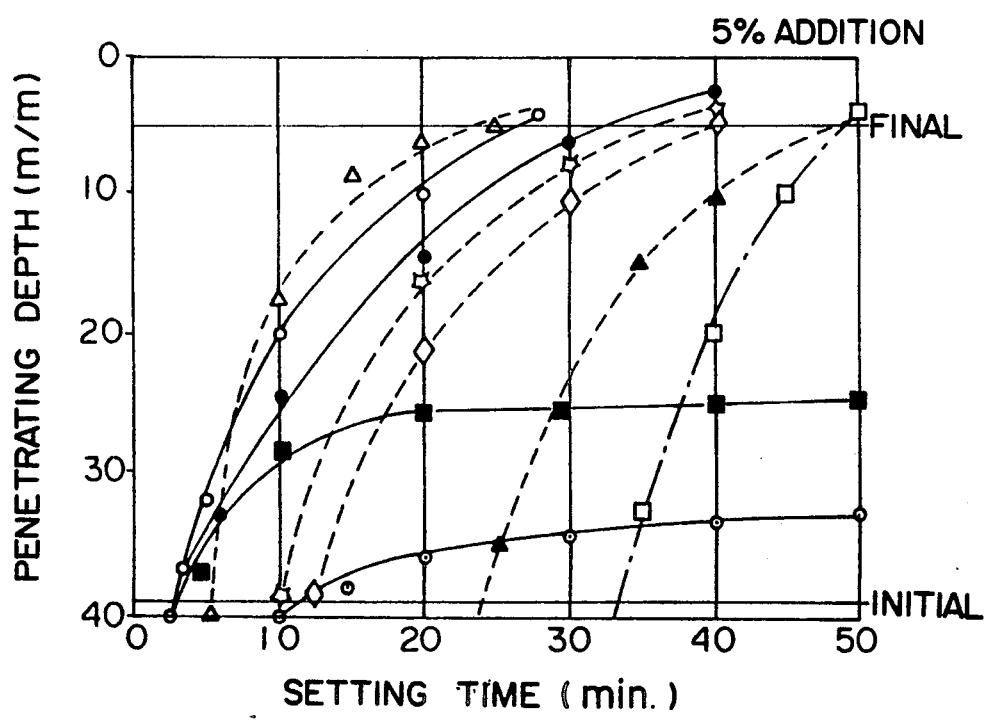
FIGS. 1 to 4 are graphs each showing the setting and hardening of a cement paste in terms of the change with time in the needle penetrating depth, covering the cement setting accelerator of the present invention and the comparative experiment, FIGS. 1 to 4 differing from each other in the addition amount of the cement setting accelerator.
Figure 2:
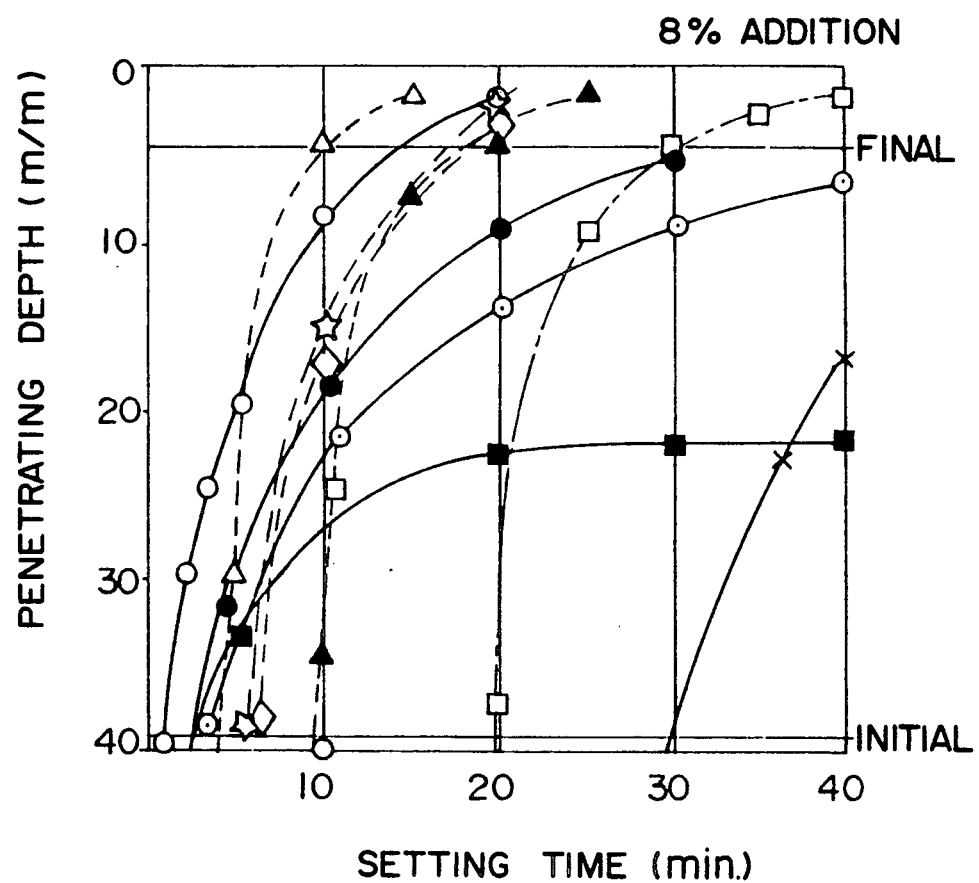
Figure 3:
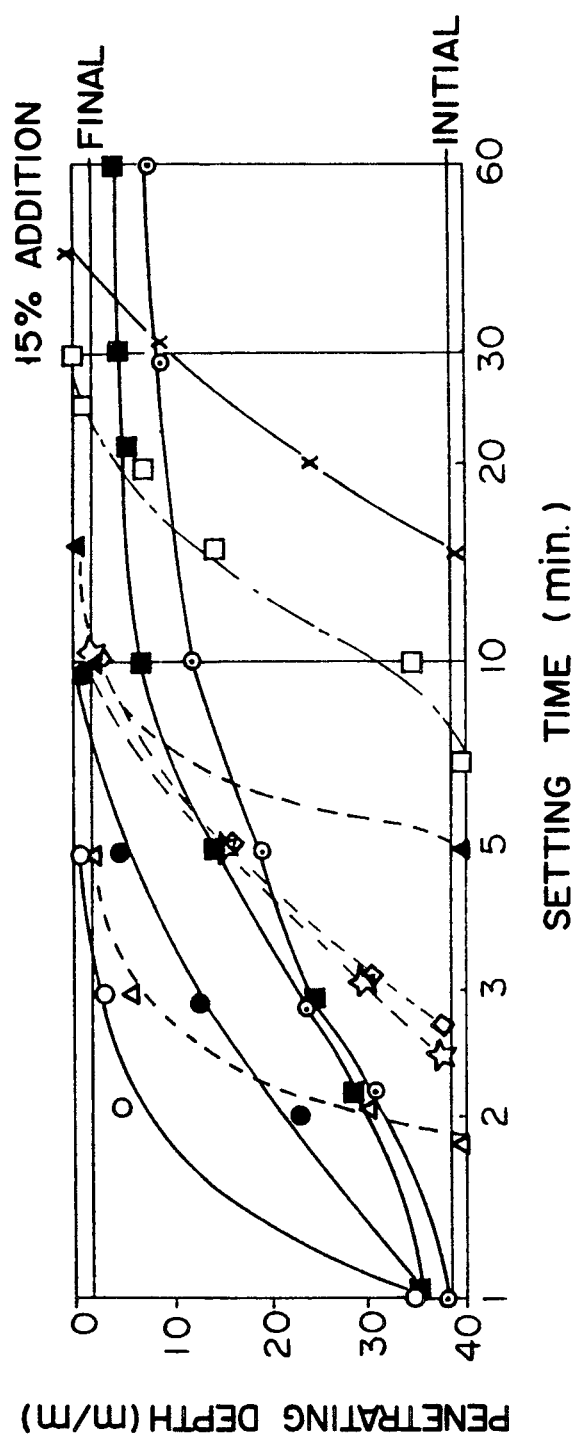
Figure 4:
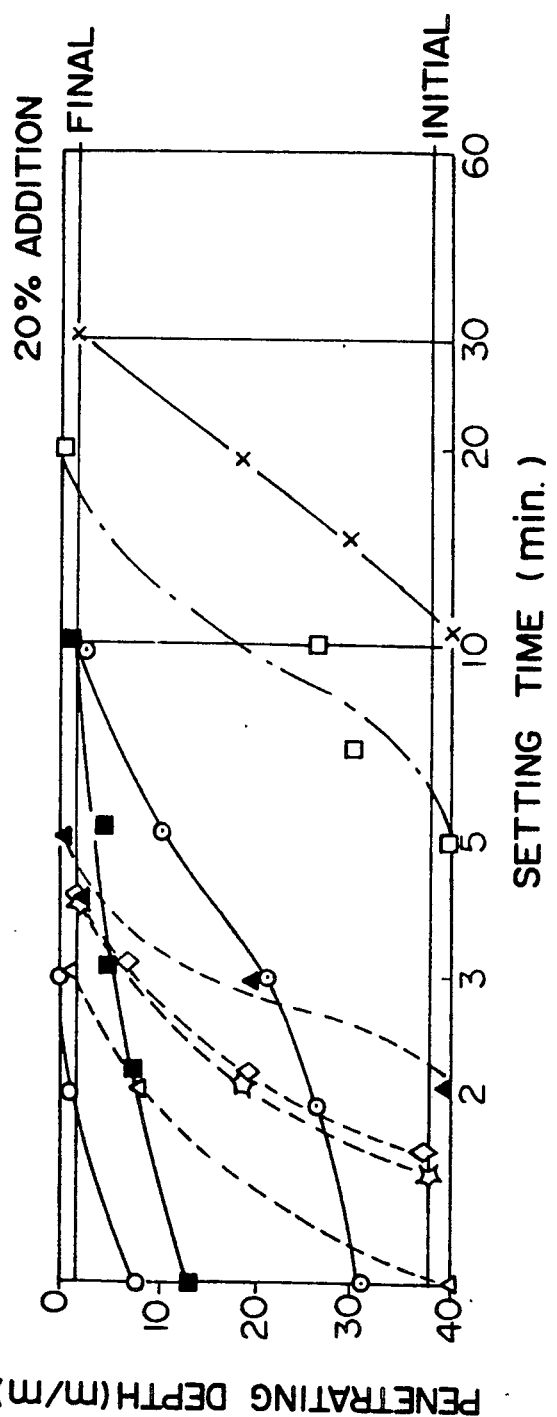

We claim:

1. A cement setting accelerator, comprising:
   100 parts by weight of a sintered powdery material prepared by pulverizing a sintered body containing 4.25 to 85% of $3CaO.2Na_2O.5Al_2O_3$, 0.75 to 15% of $Na_2SO_4$, and at most 95% of $Na_2O.Al_2O_3$, said sintered body being obtained by sintering at 1150° C. or more a raw material containing 19.7 to 36.9% of $Na_2O$, 54.0 to 61.8% of $Al_2O_3$, 0.9 to 17.8% of CaO, and 0.4 to 9.5% of $SO_3$;
   5 to 70 parts by weight of an alkali metal carbonate powder; and
   at most 170 parts by weight of a lime powder.

2. A cement setting accelerator, comprising:
   100 parts by weight of a sintered powdery material prepared by pulverizing a sintered body containing 0.85 to 84.15% of $3CaO.2Na_2O.5Al_2O_3$, 0.15 to 14.85% of $Na_2SO_4$, and 1 to 99% of $4CaO.3Al_2O_3.SO_3$, said sintered body being obtained by sintering at 1150° C. or more a raw material containing 0.2 to 19.5% of $Na_2O$, 50.2 to 54.0% of $Al_2O_3$, 18.0 to 36.5% of CaO, and 8.5 to 13.1% of $SO_3$;
   5 to 70 parts by weight of an alkali metal carbonate powder; and
   at most 170 parts by weight of a lime powder.

* * * * *